(12) United States Patent
Liu et al.

(10) Patent No.: US 8,890,056 B2
(45) Date of Patent: Nov. 18, 2014

(54) LIGHT GUIDE MODULE HAVING DUAL REFLECTING LAYER WHEREIN LIGHT BEAM BEING PARTLY ABSORBED BY THE FIRST REFLECTING LAYER AND OPTICAL DETECTION DEVICE THEREOF

(71) Applicant: PixArt Imaging Inc., Science-Based Industrial Park, Hsin-Chu (TW)

(72) Inventors: Tien-Chia Liu, Hsin-Chu (TW);
Hui-Hsuan Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 189 days.

(21) Appl. No.: 13/688,239

(22) Filed: Nov. 29, 2012

(65) Prior Publication Data
US 2013/0334406 A1    Dec. 19, 2013

(30) Foreign Application Priority Data
Jun. 13, 2012  (TW) .............................. 101121084 A

(51) Int. Cl.
*G01J 1/04*  (2006.01)
*F21V 7/22*  (2006.01)
*F21V 8/00*  (2006.01)

(52) U.S. Cl.
CPC ................ *G02B 6/0011* (2013.01); *F21V 7/22* (2013.01); *G01J 1/04* (2013.01)
USPC ....................................... 250/227.11; 250/239

(58) Field of Classification Search
USPC ............. 250/227.11, 227.14, 227.21, 227.31, 250/239, 216; 349/61–68; 362/601–628; 385/9, 11, 129, 147, 901
See application file for complete search history.

(56) References Cited

U.S. PATENT DOCUMENTS 8,480,284 B2 *  7/2013  Lin et al. ....................... 362/611

\* cited by examiner

*Primary Examiner* — Que T Le
(74) *Attorney, Agent, or Firm* — Winston Hsu; Scott Margo

(57) ABSTRACT

A light guide module is disclosed in the present invention. The light guide module includes a light guide plate, and an optical reflecting structure disposed on a bottom of the light guide plate. A beam is transmitted into the light guide plate through its side surface. Total internal reflection characters of the light guide plate is interfered by the optical reflecting structure, so that the beam can emit out of the light guide plate through a light emitting surface of the light guide plate. The optical reflecting structure includes a first reflecting layer disposed on the bottom, and a second reflecting layer formed above the first reflecting layer. The beam is absorbed by the first reflecting layer. The beam is reflected out of the light emitting surface via the second reflecting layer, and the second reflecting layer is between the first reflecting layer and the light guide plate.

23 Claims, 4 Drawing Sheets

LIGHT GUIDE MODULE HAVING DUAL REFLECTING LAYER WHEREIN LIGHT BEAM BEING PARTLY ABSORBED BY THE FIRST REFLECTING LAYER AND OPTICAL DETECTION DEVICE THEREOF

BACKGROUND OF THE INVENTION

1. Field of the Invention

The present invention relates to a light guide module and an optical detection device thereof, and more particularly, to a light guide module with low signal interference and high detecting accuracy and an optical detection device thereof.

2. Description of the Prior Art

A light guide plate is a key element of the backlight module for guiding directions of light transmission. The light guide plate applied to the edge-type backlight module can increase illumination of the panel and uniformly control the illumination. The lighting unit of the conventional edge-type backlight module is disposed by a side of the light guide plate. A beam emitted from the lighting unit can enter the light guide plate through its side surface, and is transmitted to a far end of the light guide plate by total internal reflection. A plurality of reflection parts is printed on the bottom of the light guide plate. The total internal reflection inside the light guide plate can be interfered by the reflection parts, and the reflection parts can further transmit the beam out of the light guide plate upwardly by reflection. The illumination of the panel corresponds to dimensions and arrangements of the reflection parts. The conventional edge-type light guide plate is merely utilized in the backlight module without the other application. Thus, design of an optical detection device that utilizes the edge-type light guide plate to be an optical sensor for high sensitivity and preferred accuracy is an important issue in the optical industry.

SUMMARY OF THE INVENTION

The present invention provides a light guide module with low signal interference and high detecting accuracy and an optical detection device thereof for solving above drawbacks.

According to the claimed invention, a light guide module includes a light guide plate and at least one optical reflecting structure. A beam is transmitted into the light guide plate through a side surface of the light guide plate. The light guide plate includes a light emitting surface and a bottom, and the light emitting surface and the bottom are respectively disposed on two different surfaces of the light guide plate. The optical reflecting structure is disposed on the bottom. Total internal reflection characters of the light guide plate is interfered by the optical reflecting structure, and the beam is transmitted out of the light guide plate through the light emitting surface by the optical reflecting structure. The optical reflecting structure includes a first reflecting layer and a second reflecting layer. The first reflecting layer is disposed on a bottom surface of the light guide plate, and the beam is partly absorbed by the first reflecting layer. The second reflecting layer is formed above the first reflecting layer, and the beam is reflected outward the light emitting surface via the second reflecting layer. The second reflecting layer is formed between the first reflecting layer and the light guide plate.

According to the claimed invention, an optical detection device includes a lighting unit, a light guide module and an optical detector. The light unit is disposed by a side of the light guide module. The light guide module includes a light guide plate and at least one optical reflecting structure. A beam is transmitted into the light guide plate through a side surface of the light guide plate. The light guide plate includes a light emitting surface and a bottom, and the light emitting surface and the bottom are respectively disposed on two different surfaces of the light guide plate. The optical reflecting structure is disposed on the bottom. Total internal reflection characters of the light guide plate is interfered by the optical reflecting structure, and the beam is transmitted out of the light guide plate through the light emitting surface by the optical reflecting structure. The optical reflecting structure includes a first reflecting layer and a second reflecting layer. The first reflecting layer is disposed on a bottom surface of the light guide plate, and the beam is partly absorbed by the first reflecting layer. The second reflecting layer is formed above the first reflecting layer, and the beam is reflected outward the light emitting surface via the second reflecting layer. The second reflecting layer is formed between the first reflecting layer and the light guide plate. The optical detector is disposed under the light guide plate. The optical detector receives an optical reflection signal generated from an external object disposed on the light emitting surface.

The optical reflecting structure of the light guide module of the present invention is composed of the reflecting layers with different reflection rates. The upper reflecting layer can damage the total internal reflection characters of the light guide plate, so that the beam can be transmitted out of the light guide plate through the light emitting surface by the optical reflecting structure (the positive surface). The low reflecting layer has low reflection rate and wide dimensions, and can absorb the beam effectively to prevent the optical detector from capturing the image of the optical reflecting structure. The image of the optical reflecting structure is the spot on the capture of the optical detector. Therefore, the light guide module of the present invention not only can change directions of beam transmission for uniform backlight, but also can be the induction component of the optical detection device. The optical detector disposed under the light guide plate can accurately capture a track of the external object moving over the light guide plate, and can effectively obviate the spot interference that is generated by the plurality of optical reflecting structures, so as to obtain the high detection accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
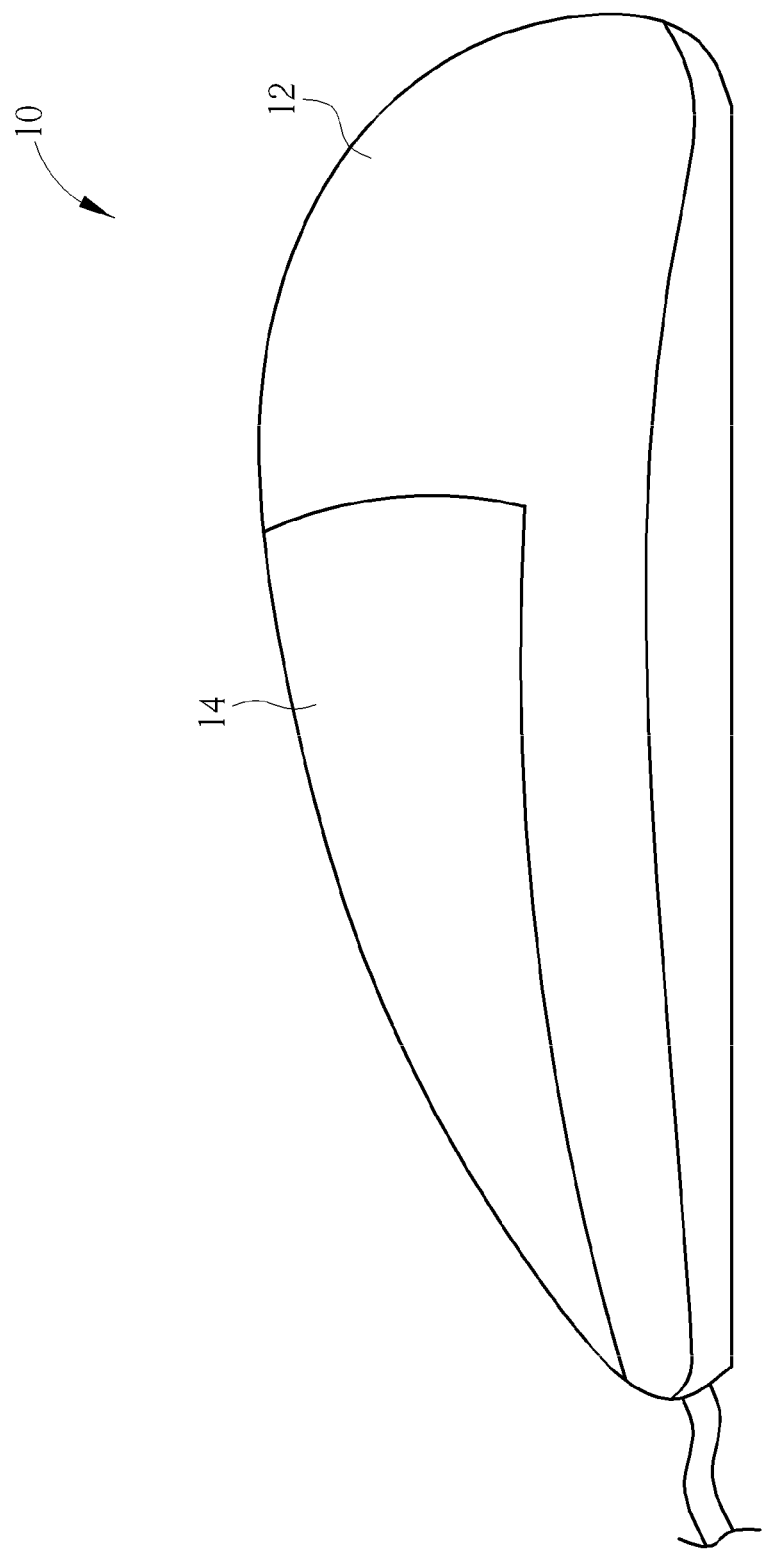
FIG. 1 is a diagram of an optical-control apparatus according to an embodiment of the present invention.
Figure 2:
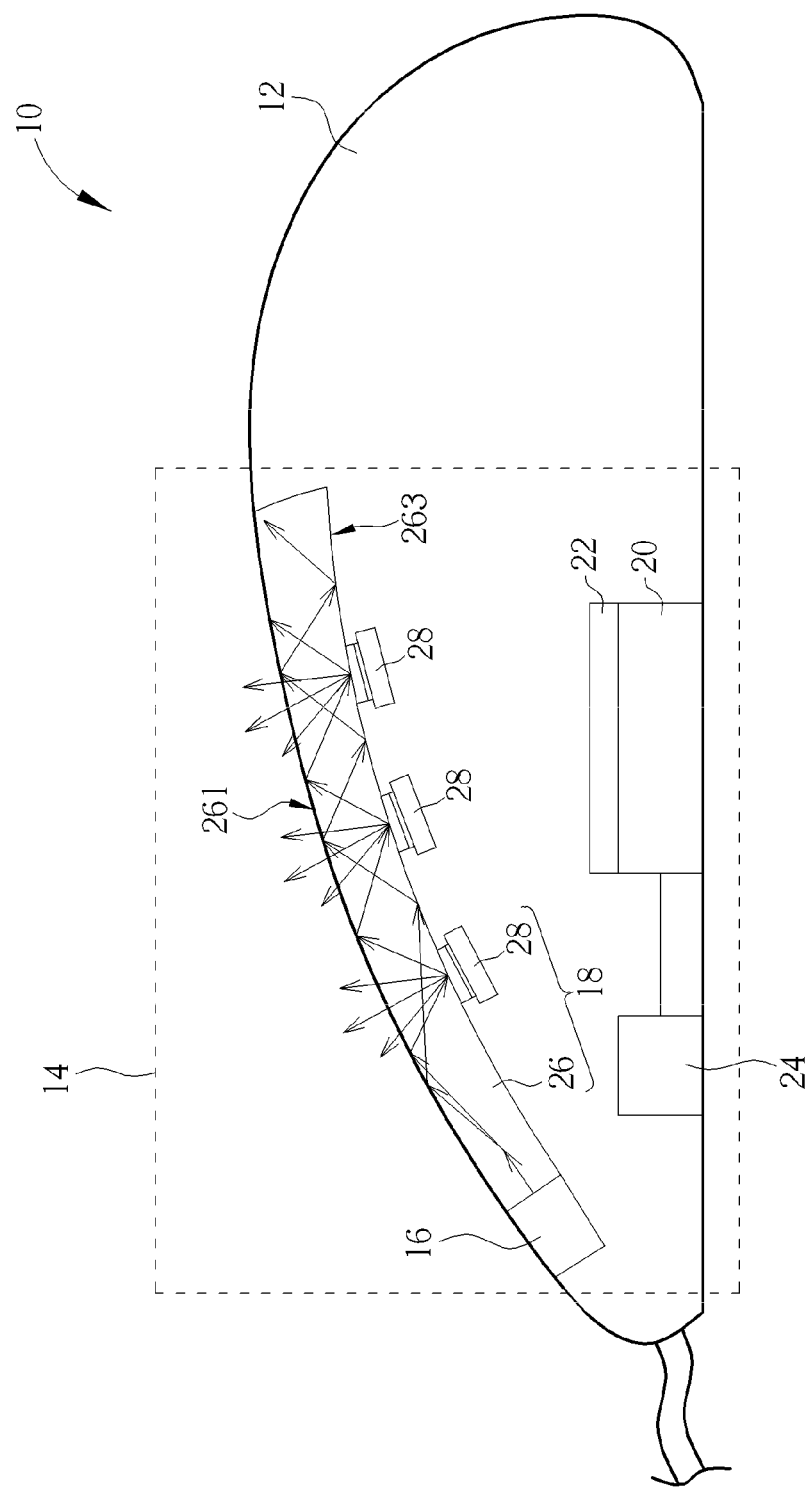
FIG. 2 is a sectional view of the optical-control apparatus according to the embodiment of the present invention.

Please refer to FIG. 1 and FIG. 2. FIG. 1 is a diagram of an optical-control apparatus 10 according to an embodiment of the present invention. FIG. 2 is a sectional view of the optical-control apparatus 10 according to the embodiment of the present invention. The optical-control apparatus 10 can include a casing 12 and an optical detection device 14. The casing 12 covers a plurality of electronic components of the optical-control apparatus 10 for protection. The electronic components can be a circuit board, a processor, a transmission cable and so on. The optical detection device 14 is disposed on a surface of the casing 12. The optical detection device 14 can control operation of the electronic components inside the optical-control apparatus 10 by an optical reflection theory and an optical interception theory. The optical-control apparatus 10 can be an optical mouse, a touch panel and so on.

The optical detection device 14 includes a lighting unit 16, a light guide module 18, an optical detector 20, a filtering component 22 and a controller 24. The lighting unit 16 is disposed by a side of the light guide module 18. The lighting unit 16 can be a light emitting diode (LED) for providing uniform beam, as an arrow shown in FIG. 2. The light guide module 18 includes a light guide plate 26 and a plurality of optical reflecting structures 28. The light guide plate 26 can be an edge-type light guide plate. The beam emitted from the lighting unit 16 can be transmitted into the light guide plate 26 through its side surface, and then the beam can be transmitted inside the light guide plate 26 by total internal reflection. The light guide plate 26 includes a light emitting surface 261 and a bottom 263. The light emitting surface 261 and the bottom 263 are respectively disposed on two opposite surfaces of the light guide plate 26.

Each optical detecting structure 28 is disposed on the bottom 263 of the light guide plate 26. The total internal reflection characters of the light guide plate 26 can be interfered by the optical detecting structure 28, so that the beam can be reflected to out of the light guide plate 26 through the light emitting surface 261. Generally, the plurality of optical reflecting structures 28 can be arranged on the bottom 263 as an array. FIG. 2 shows parts of the optical reflecting structures 28, and actual application is not limited to the above-mentioned embodiment. For example, the parts or all of the optical reflecting structures 28 can be disposed inside the bottom 263 of the light guide plate 26, and functions of the light guide plate 26 still work as usual. The light guide plate 26 can cross over the right edge and the left edge of the optical-control apparatus 10, so that the optical-control apparatus 10 can detect movements of user's figures when putting a hand on the optical-control apparatus 10.

In addition, the optical detector 20 can be formed at a suitable area inside the casing 12. Any position that field-of-view of the optical detector 20 can fully cover a detecting area on the light guide plate 26 is allowable in the present invention. For example, the optical detector 20 can be formed behind the casing 12, the field-of-view of the optical detector 20 points forward to cover the light guide plate 26. The optical detector 20 can further be formed inside the casing 12 and under the light guide plate 26, the field-of-view of the optical detector 20 points upward to cover the light guide plate 26. A plurality of optical detectors 20 can further be utilized, so as to increase whole field-of-view of the optical detection device 14. Disposition of the optical detector 26 is not limited to the above-mentioned embodiment, and detailed description is omitted herein for simplicity. The embodiment that the optical detector 20 is formed under the light guide plate 26 is illustrated as following.

When an external object is put on the light emitting surface 261 of the light guide plate 26, the optical detector 20 can receive an optical reflection signal generated by the external object. Meanwhile, the controller 24 electrically connected to the optical detector 20 can read a result of the optical detector 20 (the result corresponds to the optical reflection signal), to analyze a position and an action of the external object on the light guide plate 26, and then to output a corresponding control command for driving operation of the electronic components inside the optical-control apparatus 10. For example, the position and the action of the external object can indicate click frequency or click position. The filtering component 22 can be disposed between the light guide plate 26 and the optical detector 20 selectively. For preventing a waveband of the beam from the lighting unit 16 from corresponding to a reaction wavelength of the optical detector 20, which results in an error detection, the optical detection device 14 can utilize the filtering component 22 to filter unnecessary waveband of the beam, so that the optical detector 20 can read signals without noise according to its own reaction wavelength.

Figure 3:
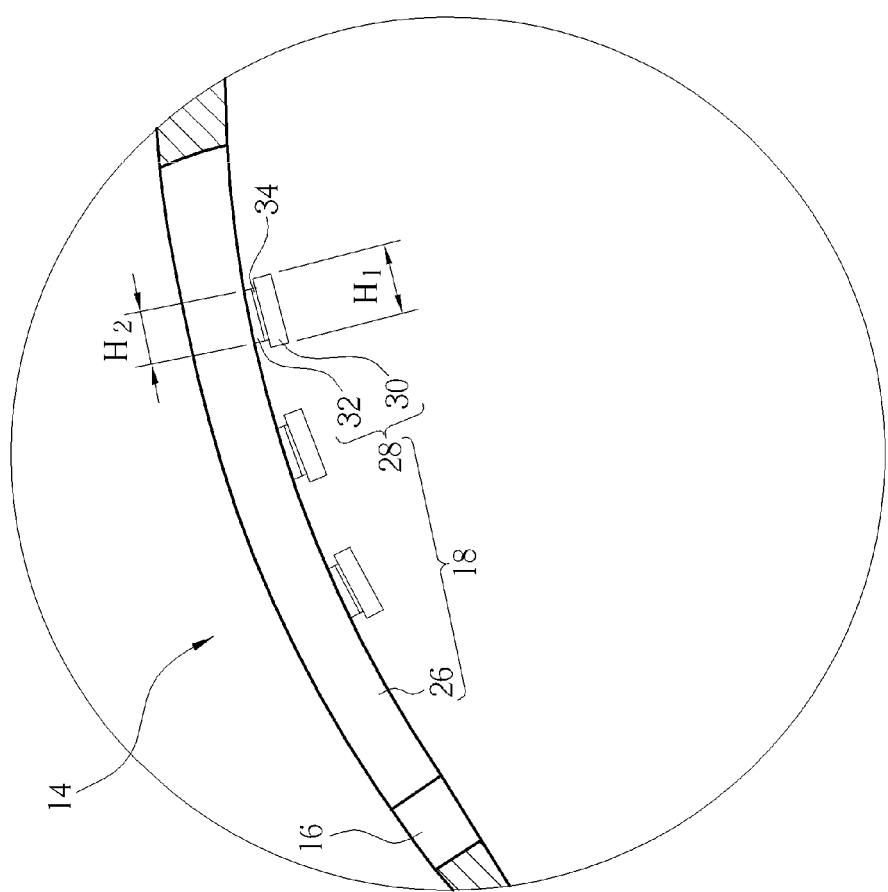
FIG. 3 is an enlarged diagram of a part of an optical detection device according to the embodiment of the present invention.

Please refer to FIG. 3. FIG. 3 is an enlarged diagram of a part of the optical detection device 14 according to the embodiment of the present invention. As shown in FIG. 3, the optical reflecting structure 28 can include a first reflecting layer 30 and a second reflecting layer 32. The first reflecting lay 30 is disposed on a bottom surface of the light guide plate 26, and the bottom surface is an external surface of the bottom 263. The second reflecting layer 32 is formed above the first reflecting layer 30. An optical reflection rate of the first reflecting layer 30 can be substantially smaller than an optical reflection rate of the second reflecting layer 32. For example, the optical reflection rate of the first reflecting layer 30 can be substantially smaller than 20%. Therefore, the beam can be partly absorbed by the first reflecting layer 30, so as to prevent the beam from directly transmitting to the optical detector 20. Further, the beam can be reflected by the second reflecting layer 32 to out of the light guide plate 26 through the light emitting surface 261. Optical sensitivity of bottom of the optical reflecting structure 28 (the first reflecting layer 30) is low, and top of the optical reflecting structure 28 (the second reflecting layer 32) can reflect the beam upwardly, so as to prevent the optical detector 20 from capturing spots of the optical reflecting structures 28. Image processing of the optical detector 20 and the controller 24 may be interfered by the spots.

As shown in FIG. 3, the second reflecting layer 32 is formed between the first reflecting layer 30 and the light guide plate 26, and a width H1 of the first reflecting layer 30 can be substantially greater than or equal to a width H2 of the second reflecting layer 32. Therefore, parts of the first reflecting layer 30 protruding from two ends of the second reflecting layer 32 can block the beam from transmitting into the casing 12 by the second reflecting layer 32. The optical detector 20 does not receive the beam reflected from the second reflecting layer 32. The protruding parts of the first reflecting layer 30 can effectively transmit the beam out of the light emitting surface 261 of the light guide plate 26 by reflection, and decrease spot noise of the optical reflecting structure 28 that is captured by the optical detector 20. Furthermore, the optical reflecting structure 28 can further include a bridging layer 34 disposed between the first reflecting layer 30 and the second reflecting layer 32. The optical reflecting structure 28 can utilize the bridging layer 34 to increase adhesion between the first reflecting layer 30 and the second reflecting layer 32. The bridging layer 34 can further increase a thickness of the optical reflecting structure 28, so that incident angle and emergent angle of the optical reflecting structure 28 can be varied by refraction index of the bridging layer 34.

It should be mentioned that the optical reflecting structure 28 of the light guide module 18 can be made by a printing method or the other non-printing method. By the printing method, the optical reflecting structure 28 can be printed on the light guide plate 26 (such as printing on the external surface of the bottom 263) by an ink printing method after the light guide plate 26 is manufactured. Thus, the first reflecting layer 30 and the second reflecting layer 32 can respectively be mesh dots, which means the first reflecting layer 30 and the second reflecting layer 32 can be color coatings with different reflection rates. Color and material of the reflecting layers corresponds to design demand, and detailed description is omitted herein for simplicity. Further, the optical reflecting structure 28 can be formed on the light guide plate 26 (such as forming on an inner surface of the bottom 263) by a mold processing method during manufacture of the light guide plate 26. The mold processing method can include an etching method, a V-cut method, a stamper method and so on. Therefore, the first reflecting layer 30 and the second reflecting layer 32 can be microetching layers with different reflection rates, or optical reflecting layers made by different material. An aim of the first reflecting layer 30 is for blocking the beam from transmitting into the casing 12 by the second reflecting layer 32, so that the first reflecting layer 30 has to partially cover a boundary of the second reflecting layer 32.

Figure 4:
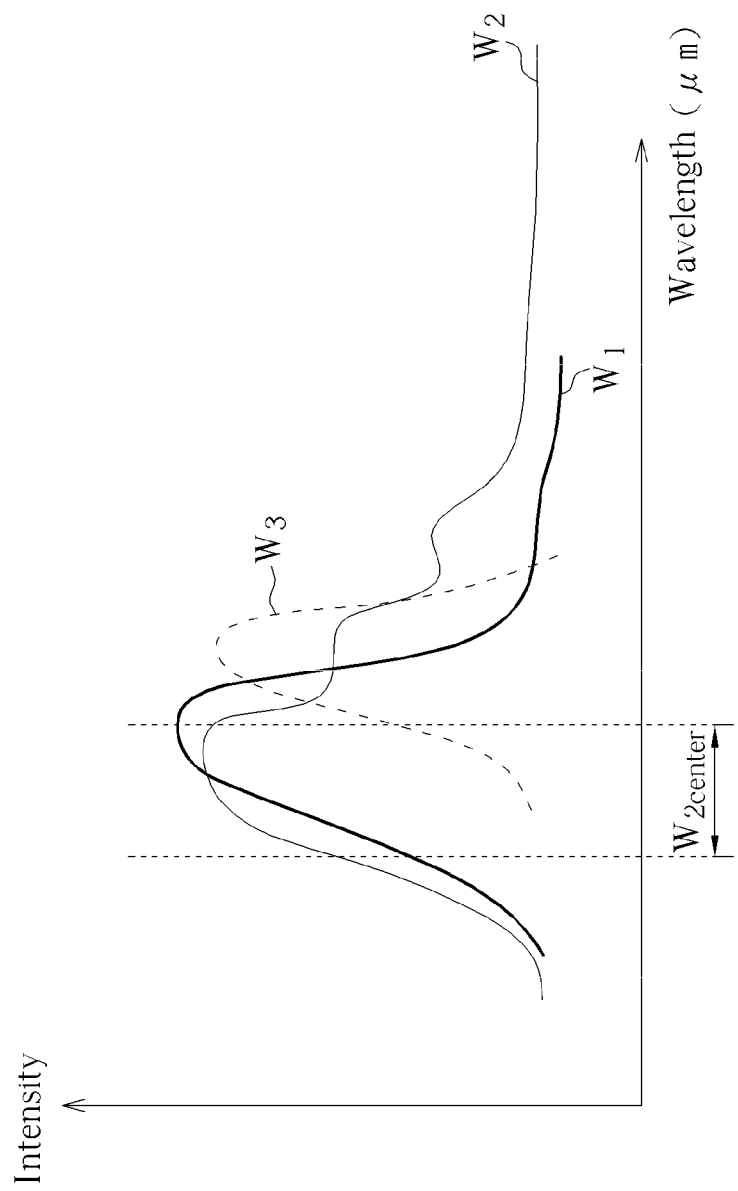
FIG. 4 is a waveband diagram of a lighting unit, a first reflecting layer and an optical detector according to the embodiment of the present invention.

Besides, a waveband $W_1$ of the beam from the lighting unit 16 can correspond to a reflection waveband $W_2$ of the first reflecting layer 30. The reaction wavelength $W_3$ of the optical detector 20 can be within a range of the reflection waveband $W_2$ of the first reflecting layer 30, and does not overlap a central reflection waveband $W_{2center}$ of the first reflecting layer 30. Please refer to FIG. 4. FIG. 4 is a waveband diagram of the lighting unit 16, the first reflecting layer 30 and the optical detector 20 according to the embodiment of the present invention. The lighting unit 16 can be a laser LED, and the laser LED has narrow waveband $W_1$. For example, the lighting unit 16 can emit an infrared signal. The first reflecting layer 30 can be manufactured to be a unit that has a waveband close to the lighting unit 16 according to color property or material property, such as a red color coating. A range of the reflection waveband $W_2$ is wider than the waveband $W_1$, and the central reflection waveband $W_{2center}$ overlaps a highest area within the waveband $W_1$. The reaction wavelength $W_3$ of the optical detector 20 does not overlap a peak of the reflection waveband $W_2$ (the central reflection waveband $W_{2center}$) preferably, and further is formed inside the range of the reflection waveband $W_2$. Therefore, the first reflecting layer 30 can effectively absorb the beam emitted from the lighting unit 16. The optical detector 20 is insensitive about the first reflecting layer 30, and still can capture the beam emitted from the lighting unit 16.

In conclusion, the present invention utilizes the light guide plate 26 to be an induction component of the optical detection device 14. The plurality of optical reflecting structures 28 can be formed on the bottom 263 of the light guide plate 26 as the array. Each optical reflecting structure 28 can be composed of two reflecting layers. When the optical detection device 14 is started, the low first reflecting layer 30 absorbs the beam for preventing the optical detector 20 from capturing the beam reflected by the first reflecting layer 30. The upper second reflecting layer 32 has preferred optical reflection rate. The total internal reflection characters of the light guide plate 26 is interfered by the second reflecting layer 32, the beam is transmitted upwardly to out of the light guide plate 26 through the light emitting surface 261, so as to decrease interference of the optical reflecting structure 28 that is captured by the optical detector 20. Pixel dimensions of the optical detector 20 can be substantially greater than dimensions of the optical reflecting structure 28. For example, the pixel dimensions of the optical detector 20 can be three times the dimensions of the optical reflecting structure 28. According to the above-mentioned design, the interference of the optical reflecting structure 28 can be decreased effectively. The optical detector 20 can capture the image without the spots.

When operating the optical-control apparatus 10, the external object, such as a hand or a stylus, can move above the light emitting surface 261 of the light guide plate 26. With a movement of the external object, the beam out of the light guide plate 26 by the optical reflecting structure 28 is blocked due to the external object, and then the optical reflection signal is generated immediately. The optical reflection signal is transmitted downward to pass through the light guide plate 26, and is received by the optical detector 20. The controller 24 can output the control command according to the result of the optical detector 20, so as to control the optical-control apparatus 10 to execute the corresponding application program. The result of the optical detector 20 can be a position, a moving curve or a stay period of the finger on the light guide plate 26.

Comparing to the prior art, the optical reflecting structure of the light guide module of the present invention is composed of the reflecting layers with different reflection rates. The upper reflecting layer can damage the total internal reflection characters of the light guide plate, so that the beam can be transmitted out of the light guide plate through the light emitting surface by the optical reflecting structure (the positive surface). The low reflecting layer has low reflection rate and wide dimensions, and can absorb the beam effectively to prevent the optical detector from capturing the image of the optical reflecting structure. The image of the optical reflecting structure is the spot on the capture of the optical detector. Therefore, the light guide module of the present invention not only can change directions of beam transmission for uniform backlight, but also can be the induction component of the optical detection device. The optical detector disposed under the light guide plate can accurately capture a track of the external object moving over the light guide plate, and can effectively obviate the spot interference that is generated by the plurality of optical reflecting structures, so as to obtain the high detection accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light guide module comprising:
    a light guide plate, a beam being transmitted into the light guide plate through a side surface of the light guide plate, the light guide plate comprising a light emitting surface and a bottom, the light emitting surface and the bottom being respectively disposed on two different surfaces of the light guide plate, wherein the beam is able to be delivered within the light guide plate; and
    at least one optical reflecting structure disposed on the bottom, total internal reflection characters of the light guide plate being interfered by the optical reflecting structure, and the beam being transmitted out of the light guide plate through the light emitting surface by the optical reflecting structure, the optical reflecting structure comprising:
        a first reflecting layer disposed on a bottom surface of the light guide plate, the beam being partly absorbed by the first reflecting layer; and
        a second reflecting layer formed above the first reflecting layer, the beam being reflected outward the light emitting surface via the second reflecting layer, wherein the second reflecting layer is formed between the first reflecting layer and the light guide plate.

2. The light guide module of claim 1, wherein an optical reflection rate of the first reflecting layer is substantially smaller than an optical reflection rate of the second reflecting layer.

3. The light guide module of claim 2, wherein the optical reflection rate of the first reflecting layer is substantially smaller than 20%.

4. The light guide module of claim 1, wherein a width of the first reflecting layer is substantially greater than a width of the second reflecting layer, the beam is reflected outward the light emitting surface of the light guide plate via a part of the first reflecting layer protruding from the second reflecting layer.

5. The light guide module of claim 1, wherein the first reflecting layer partially covers a boundary of the second reflecting layer.

6. The light guide module of claim 1, wherein the first reflecting layer and the second reflecting layer respectively are color coatings with different reflection rates, microetching layers with different dimensions, or optical reflecting layers made by different material.

7. The light guide module of claim 6, wherein the first reflecting layer and the second reflecting layer are formed on the light guide plate by an ink printing method or a mold processing method.

8. The light guide module of claim 1, wherein the optical reflecting structure further comprises a bridging layer disposed between the first reflecting layer and the second reflecting layer for substantially adhere the first reflecting layer and the second reflecting layer.

9. An optical detection device comprising:
a lighting unit;
a light guide module, the light unit being disposed by a side of the light guide module, the light guide module comprising:
  a light guide plate, a beam being transmitted into the light guide plate through a side surface of the light guide plate, the light guide plate comprising a light emitting surface and a bottom, the light emitting surface and the bottom being respectively disposed on two different surfaces of the light guide plate; and
  at least one optical reflecting structure disposed on the bottom, total internal reflection characters of the light guide plate being interfered by the optical reflecting structure, and the beam being transmitted out of the light guide plate through the light emitting surface by the optical reflecting structure, the optical reflecting structure comprising:
    a first reflecting layer disposed on a bottom surface of the light guide plate, the beam being partly absorbed by the first reflecting layer; and
    a second reflecting layer formed above the first reflecting layer, the beam being reflected outward the light emitting surface via the second reflecting layer, wherein the second reflecting layer is formed between the first reflecting layer and the light guide plate; and
an optical detector disposed under the light guide plate, the optical detector receiving an optical reflection signal generated from an external object disposed on the light emitting surface.

10. The optical detection device of claim 9, wherein an optical reflection rate of the first reflecting layer is substantially smaller than an optical reflection rate of the second reflecting layer.

11. The optical detection device of claim 10, wherein the optical reflection rate of the first reflecting layer is substantially smaller than 20%.

12. The optical detection device of claim 9, wherein a width of the first reflecting layer is substantially greater than a width of the second reflecting layer, the beam is reflected outward the light emitting surface of the light guide plate via a part of the first reflecting layer protruding from the second reflecting layer.

13. The optical detection device of claim 9, wherein the first reflecting layer partially covers a boundary of the second reflecting layer.

14. The optical detection device of claim 9, wherein the first reflecting layer and the second reflecting layer respectively are color coatings with different reflection rates, microetching layers with different dimensions, or optical reflecting layers made by different material.

15. The optical detection device of claim 14, wherein the first reflecting layer and the second reflecting layer are formed on the light guide plate by an ink printing method or a mold processing method.

16. The optical detection device of claim 9, wherein the optical reflecting structure further comprises a bridging layer disposed between the first reflecting layer and the second reflecting layer to substantially adhere the first reflecting layer and the second reflecting layer.

17. The optical detection device of claim 9, wherein a reaction wavelength of the optical detector does not overlap a central reflection waveband of the first reflecting layer.

18. The optical detection device of claim 17, wherein a reflection waveband of the first reflecting layer corresponds to a waveband of the beam.

19. The optical detection device of claim 9, wherein pixel dimensions of the optical detector is substantially greater than dimensions of the optical reflecting structure.

20. The optical detection device of claim 19, wherein a ratio of the pixel dimensions of the optical detector to the dimensions of the optical reflecting structure is substantially greater than 3:1.

21. The optical detection device of claim 9, wherein the optical detection device further comprises a filtering component disposed between the light guide plate and the optical detector, a part waveband of the beam is filtered by the filtering component according to a reaction wavelength of the optical detector.

22. The optical detection device of claim 9, wherein the optical detection device further comprises a controller electrically connected to the optical detector, the controller analyzes a position of the external object according to a result of the optical detector, so as to output a corresponding control command.

23. The optical detection device of claim 9, wherein the optical detection device is applied to an optical-control apparatus, the light guide plate substantially covers over two edges of the optical-control apparatus.

* * * * *